United States Patent [19]

Ouska et al.

[11] 4,049,328
[45] Sept. 20, 1977

[54] SUBASSEMBLY CARTRIDGE FOR SEALING AND ADJUSTING BEARING ASSEMBLIES

[75] Inventors: Ralph C. Ouska, Hinsdale; Francois X. Bertaud, Aurora, both of Ill.

[73] Assignee: Stephens-Adamson, Inc., Aurora, Ill.

[21] Appl. No.: 689,938

[22] Filed: May 25, 1976

[51] Int. Cl.² .......................................... F16C 33/72
[52] U.S. Cl. ............................... 308/187.1; 198/830
[58] Field of Search ............... 308/20, 187.1, 240; 184/6; 198/192 R, 193

[56] References Cited

U.S. PATENT DOCUMENTS

| 3,332,536 | 7/1967 | Ebly et al. | 308/20 |
| 3,960,243 | 6/1976 | Di Antonio | 308/240 |

*Primary Examiner* — Joseph F. Peters, Jr.
*Assistant Examiner* — Gene A. Church
*Attorney, Agent, or Firm* — Robert C. Sullivan

[57] ABSTRACT

A combined bearing sealing and bearing adjusting subassembly for use with two members which rotate relative to each other upon a tapered roller bearing assembly, such as a belt conveyor idler roll which rotates relative to a stationary shaft upon a pair of axially spaced tapered roller bearing assemblies, and the combination of such a bearing sealing and bearing adjusting subassembly with a conveyor idler roll assembly. A separate cartridge-like subassembly is mounted between the two relatively rotatable members and contiguous each respective tapered roller bearing assembly. Each cartridge-like subassembly includes a combined contact seal and a labyrinth seal which cooperate to prevent ingress of foreign matter into the corresponding bearing assembly or the egress of lubricant from the bearing assembly. Each cartridge-like subassembly also includes a plastically and elastically deformable collapsible spacer member which absorbs clearances resulting from manufacturing tolerances of components of the idler roll assembly and also by controlled release of the elastic deformation of the spacer member provides a predetermined axial preload or, alternatively, end play adjustment of the corresponding tapered roller bearing assembly, as desired. The collapsible spacer is so characterized that it provides the same axial preload or end play, as desired, without individual selective adjustment, for the bearings of any one of a number of idler roll assemblies in which the components of the respective idler roll assemblies have dimensional variations within a given range of manufacturing tolerances.

19 Claims, 5 Drawing Figures

SUBASSEMBLY CARTRIDGE FOR SEALING AND ADJUSTING BEARING ASSEMBLIES

BACKGROUND OF THE INVENTION

This invention relates to a combined bearing sealing and bearing adjusting subassembly for use with two members which rotate relative to each other upon a tapered roller bearing assembly or assemblies, such as a belt conveyor idler roll which rotates relative to a stationary shaft upon a pair of axially spaced tapered roller bearing assemblies. The invention also pertains to the combination of such a bearing sealing and bearing adjusting subassembly with two relatively rotatable members which rotate relative to each other upon a tapered roller bearing assembly or assemblies.

DESCRIPTION OF THE PRIOR ART

As a rule in an idler conveyor roll where the shaft is stationary and fitted with antifriction bearings supporting the roller shell, means are provided in assembly to restrict longitudinal (axial) movement of the shell with respect to the shaft. This is of particular importance on conveyor rolls equipped with tapered roller bearings to make sure that bearing cup, bearing rollers and cone are properly located in relation to each other and further that their contact pressure falls within the acceptable range. This adjustment is typically accomplished by threaded parts engaging the shaft and abutting the bearing cone. After adjustment (usually manual) the threaded part is locked to the shaft with a set screw or some other means. While the abutting relation of the threaded member to the bearing cone just described provides a "preload" condition which prevents axial movement of the bearing cup and the bearing cone relative to each other, it is sometimes desirable to permit a controlled or limited amount of axial movement, or "end play," of the bearing cone and the bearing cup relative to each other. A typical arrangement using a threaded nut member to provide adjustment of tapered roller bearings is shown in U.S. Pat. No. 3,489,471, issued to Hugh D. Kelley, on Jan. 13, 1970.

It has also been known in the prior art relating to idler rolls for belt conveyors to provide various types of sealing arrangments for excluding sand or other dusty material from the bearing which supports the idler roll for rotation with respect to a stationary shaft, the seal also serving to retain in the bearing the grease necessary for lubrication of the bearing. Such seal arrangements are shown, for example, by the following U.S. Pat. Nos. 3,207,291 issued to Leonard S. Barnish on Sept. 21, 1965; 3,332,536 issued to Ronald W. Ebly et al on July 25, 1967 and the aforementioned U.S. Pat. No. 3,489,471 issued to Hugh D. Kelley on Jan. 13, 1970. It is also known in the art relating to tapered roller bearings to provide plastically and elastically deformable spacer members in which the plastic deformation characteristic of the spacer member serves to absorb clearances resulting from manufacturing tolerances of components of a relatively rotatable shaft and shaft housing, and in which the elastic deformation characteristic of the spacer member serves to provide an axial preload, or, alternatively, an axial end play of the tapered roller bearing assembly, as desired. The use of plastically and elastically deformable spacer members for the purpose just mentioned is shown by U.S. Pat. No. 3,672,019 issued to Thomas George Barnbrook et al. on June 27, 1972 and by U.S. Pat. 3,726,576 issued to Thomas George Barnbrook et al on Apr. 10, 1973.

However, to the best of our knowledge it has not been known in the prior art to provide a cartridge-like bearing sealing and bearing adjusting subassembly which can be interposed between two relatively rotatable members such as an idler roll and a stationary shaft mounted for relative rotation upon a tapered roller bearing assembly, and in which the cartridge-like subassembly comprises bearing sealing means and also comprises collapsible spacer means which automatically absorbs clearances resulting from manufacturing tolerances of the components of the idler roll assembly, and at the same time applies a predetermined preload, or, alternatively, a predetermined end play adjustment, for the tapered roller bearing assembly without the necessity for selective adjustment.

STATEMENT OF THE INVENTION

Accordingly, it is an object of the present invention to provide for use between two relatively rotatable members such as an idler roll and a stationary shaft mounted for rotation with respect to each other upon tapered roller bearing assemblies a cartridge-like subassembly which provides sealing protection against the ingress of foreign matter into a corresponding bearing assembly or the egress of lubricant from the corresponding bearing assembly, the cartridge subassembly also including a collapsible spacer member which absorbs by plastic deformation clearances resulting from manufacturing tolerances of components of the idler roll assembly or the like and also by controlled release of the elastic deformation of the spacer member provides a predetermined axial preload or end play on the contiguous tapered roller bearing assembly, as desired, the collapsible spacer being so characterized that it provides the same preload or end play without individual selective adjustment for the bearings of any one of a number of idler roll assemblies in which the components of the idler roll assemblies have dimensional variations or clearances within a given range of tolerances.

It is a further object of the invention to provide a cartridge-like subassembly adapted to be interposed between two relatively rotating members, such as the roll and shaft of and idler roll assembly, mounted for rotation with respect to each other upon a tapered roller bearing assembly, in which the cartridge-like subassembly includes both contact type and labyrinth type sealing elements to prevent ingress of foreign matter into the bearing assembly or egress of lubricant from the bearing assembly, with the cartridge-like subassembly also including a collapsible spacer member which absorbs dimensional variations or clearances resulting from manufacturing tolerances of components of the idler roll assembly and which also automatically provides bearing adjustment by providing a desired amount of axial preload on or, alternatively, axial end play of the tapered roller bearing assembly, as desired, without the necessity of selective adjustment.

A still further object of the invention is to provide for use between two relatively rotatable members such as an idler roll assembly comprising an idler roll and a stationary shaft mounted for relative rotation upon a tapered roller bearing assembly, a cartridge-like subassembly including a combined contact seal and a labyrinth seal which coact to prevent ingress of foreign matter into the bearing assembly or the egress of lubricant from the bearing assembly, the cartridge subassembly also including a collapsible spacer member which absorbs clearances resulting from manufacturing tolerances components of the idler roll assembly and also provides an axial preload or axial end play adjustment of the tapered roller bearing assembly, as desired, the collapsible spacer being so characterized that it provides the same preload or end play without individual selective adjustment for the bearings of any one of a number of idler roll assemblies in which the components of the respective idler roll assemblies have dimensional variations within a given range of tolerances.

A still further object of the invention is to provide a cartridge-like subassembly containing elements for providing means for preloading, sealing, locking and maintaining a predetermined fit between idler roll, roll bearing and roll shaft of a conveyor idler roll assembly, whereby the cartridge subassembly becomes a key factor contributing to improving and extending the useful life of the conveyor idler roll assembly, and reducing manufacturing cost and simplifying assembly procedure of the conveyor idler roll assembly to the point where automated or semi-automated assembly is economically feasible and practical.

It is a still further object of the invention to provide an idler roll assembly comprising an idler roll mounted for rotation upon a stationary shaft by means of axially spaced tapered roller bearing assemblies, the idler roll assembly including combined bearing sealing and bearing adjusting subassemblies as defined in the foregoing objects.

Further objects and advantages of the invention will become apparent from the following description taken in conjunction with the accompanying drawings in which:

DESCRIPTION OF THE PREFERRED EMBODIMENT

Figure 1:
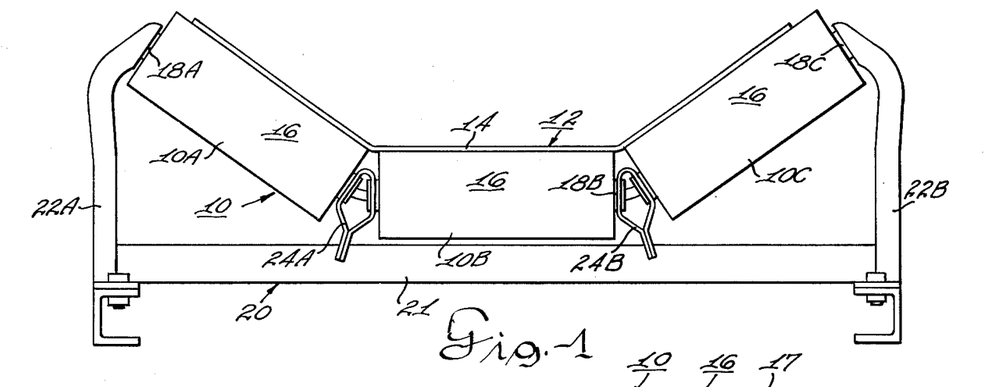
FIG. 1 is a view in front elevation of three idler rolls for a belt conveyor arranged in a configuration to provide a troughed conveyor.
Figure 2:
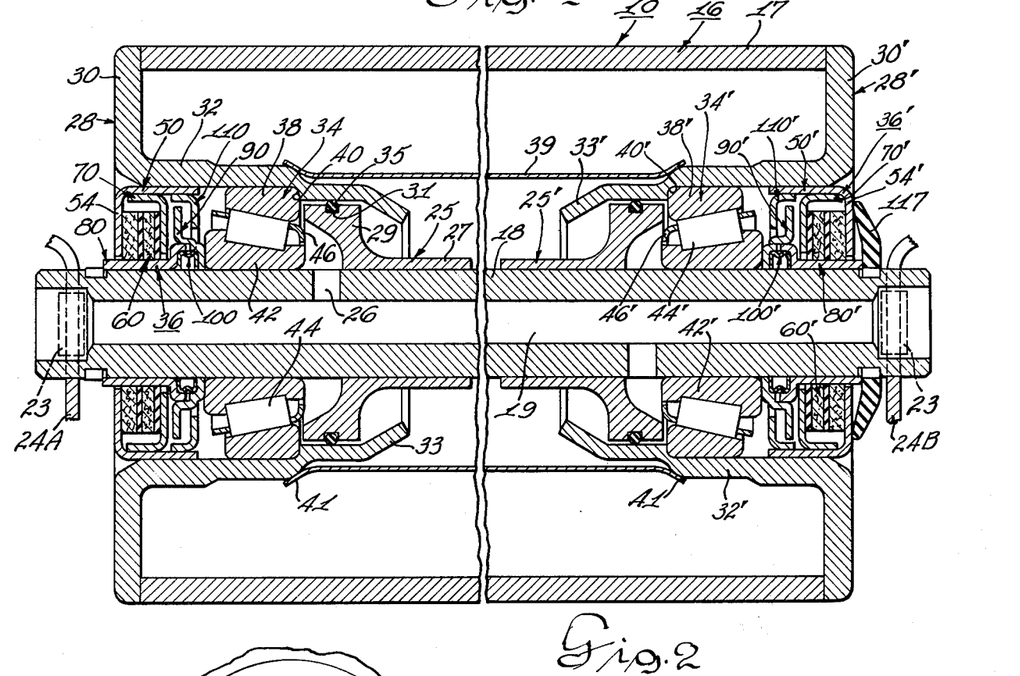
FIG. 2 is a view in axial section of one of the idler roll assemblies of FIG. 1, showing the rotatable idler roll shell subassembly mounted for rotation with respect to a stationary shaft by means of oppositely disposed tapered roller bearing assemblies, and also showing at each end of the idler roll assembly a cartridge-like subassembly which contains sealing elements and which also contains a collapsible spacer for applying an axial preload on or, alternatively, permitting axial end play of the corresponding tapered roller bearing assembly.
Figure 3:
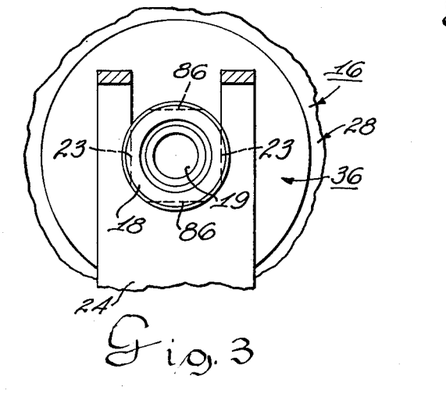
FIG. 3 is an end view, partially broken away, of one of the idler roll assemblies shown in FIG. 1, showing how the stationary shaft of the idler roll assembly is mounted on a supporting frame in such manner as to prevent rotation of the stationary shaft.
Figure 4:
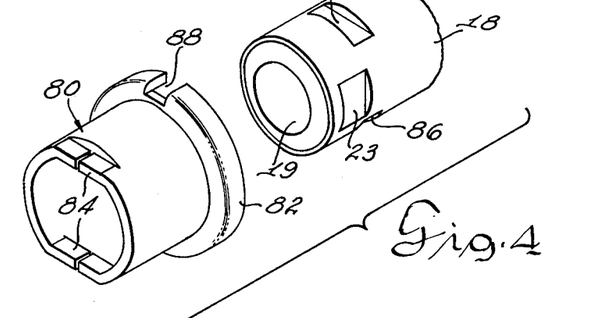
FIG. 4 is an exploded view showing the sleeve element of the cartridge-like bearing sealing and preloading subassembly, and the end of the stationary shaft of the idler roll assembly which is engaged by the sleeve element.

Referring now to the drawings and more particularly to FIG. 1, there is shown an arrangement of three idler roll assemblies generally indicated at 10 and specifically designated as 10A, 10B and 10C. The idler roll assemblies 10A, 10B and 10C are arranged to define a trough-like support for the upper run 14 of a conveyor belt generally indicated at 12. The lower run of the conveyor belt 12 is not shown in the drawing. Each of the idler roll assemblies 10A, 10B and 10C comprises a stationary shaft 18 about which an idler roll generally indicated at 16 is mounted for rotation by means of suitable bearing assemblies such as the oppositely disposed tapered roller bearing assemblies to be described hereinafter and forming part of each idler roll assembly. The stationary shaft 18 of each of the respective idler roll assemblies 10A, 10B and 10C is supported at its opposite ends by the support frame generally indicated at 20. Support frame 20 includes a horizontal base member 21 having secured at the opposite ends thereof upright members 22A and 22B and having secured thereto intermediate the length thereof spaced intermediate support brackets 24A and 24B. One end of stationary shaft 18A of inclined idler roll assembly 10A is supported by upright member 22A, while the opposite end of shaft 18A is supported by intermediate bracket 24A; the two opposite ends of the stationary shaft 18B of idler roll assembly 10B are supported by the intermediate bracket members 24A and 24B; while the opposite ends of stationary shaft 18C of inclined idler roll assembly 10C are supported by the support members 24B and 22B, respectively. As best seen in FIGS. 2, 3 and 4, the outer ends of the respective stationary shafts 18A, 18B and 18C are provided with flat surfaces 23 which engage a slot in the corresponding stationary support members whereby to prevent rotation of the respective shafts 18A, 18B and 18C with respect to their corresponding stationary supports.

Referring now to FIG. 2, which shows an assembled view of an idler roll assembly 10, it will be seen that the rotatable portion 16 of the idler roll assembly comprises a hollow cylindrical shell 17 to each of the opposite ends of which are rigidly attached, as by welding, a separate end cup generally indicated at 28 and 28'. Each end cup 28, 28' includes a disk-like radially inwardly extending end wall portion 30, 30' which merges into a generally axially inwardly extending cup portion 32, 32'. Each axially inwardly extending cup portion 32, 32' serves to receive the stationary shaft 18, the tapered roller bearing assembly generally indicated at 34, 34' and the sealing and preloading cartridge subassembly generally indicated at 36, 36'. Each cup portion 32, 32' also receives a portion of a corresponding grease retainer generally indicated at 25, 25' as will be described in more detail hereinafter.

In describing the tapered roller bearing assembly 34 and the sealing and preloading cartridge assembly 36 and the relation of these subassemblies to the other portions of idler roll assembly 10, generally speaking, the bearing assembly 34 and the sealing and preloading cartridge subassembly 36 at only one end of the idler roll assembly 10 will be described (namely, the left-hand end relative to the view of FIG. 2) since a similar arrangement of the bearing assembly 34 and of the sealing and preloading cartridge subassembly 36 is provided at each of the opposite ends of the idler roll assembly 10. However, corresponding parts at the opposite end of the roll assembly 10 will be identified by the same numbers primed (').

Bearing assembly 34 comprises an outer race or bearing cup 38 which seats against a radially inwardly extending shoulder 40 of hollow cup portion 32, bearing cup being press fitted into cup portion 32. Bearing cup 38 rotates with the rotatable idler roll 16. The tapered roller bearing assembly 34 also comprises an inner race or bearing cone 42 which is mounted on the outer periphery of stationary shaft 18, and tapered rollers 44 which are interposed between bearing cup 38 and bearing cone 42. The tapered roller bearing assembly 34 also includes a bearing cage 46 as is well known in the art of tapered roller bearings.

The sealing and preloading cartridge subassembly 36 which is interposed between stationary shaft 18 and rotatable idler roll 16 comprises seven individual basic elements which will now be numerated and which will be described in more detail hereinafter:

a. the seal case cup generally indicated at 50,
b. the felt seal generally indicated at 60,
c. the seal retainer cup generally indicated at 70,
d. the sleeve generally indicated at 80,
e. the labyrinth cup generally indicated at 90,
f. the plastically and elastically deformable collapsible spacer generally indicated at 100, and
g. the retainer cup generally indicated at 110.

The various parts just enumerated and their relationship to each other and to the various other parts of the idler roll assembly 10 will be described hereinafter in more detail.

Figure 5:
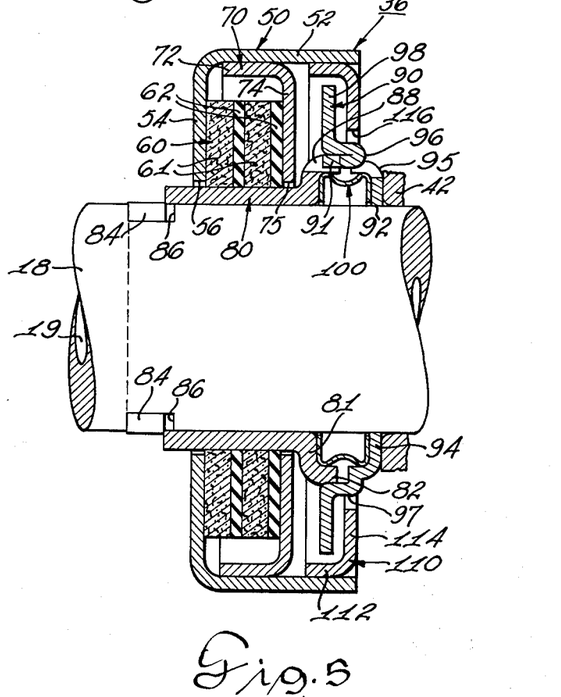
FIG. 5 is an enlarged view in axial section of the cartridge-like bearing sealing and preloading subassembly, the stationary shaft about which the subassembly is mounted also being shown.

Seal case cup 50 of cartridge subassembly 36 is an outer member into which all of the elements of the cartridge are assembled. Seal case cup 50 is a cup-like member which includes an axially extending cylindrical wall portion 52 which extends for the greater part of the entire length of the cartridge subassembly, and a radially extending end wall portion 54. End wall portion 54 of seal case cup 50 is provided with a centrally located bore 56 which is adapted to receive stationary shaft 18 and sleeve 80 of the cartridge assembly which surrounds shaft 18. The outside diameter of cylindrical wall portion 52 of seal case cup 50 is sized for a press fit into cup portion 32 of idler roll 16. The diameter of bore 56 of the seal case cup 50 is so dimensioned as to provide a close running fit of seal case cup 50 with respect to the outer diameter of cartridge sleeve 80 as seal case cup 50 rotates with idler roll 16 with respect to stationary sleeve 80 and stationary shaft 18.

The contact seal or "felt seal" generally indicated at 60 is retained between the facing radially extending walls of the seal case cup 50 and of the seal retainer cup 70. The seal retainer cup 70 is a cup-like member having an axially extending cylindrical wall portion 72 and a radially extending wall portion 74. The outer diameter of the cylindrical and axially extending wall portion 72 of seal retainer cup 70 is such as to provide a press fit of seal retainer cup 70 into seal case cup 50 whereby seal case cup 50 and seal retainer cup 70 rotate together with rotatable idler roll 16. The axial spacing between the facing surfaces of radially extending wall 54 of seal case cup 50 and of radially extending wall 74 of seal retainer cup 70 is such as to maintain the felt seal, generally indicated at 60, under axial compression and whereby to insure that felt seal 60 rotates with the seal case cup 50 and with seal retainer cup 70 as they rotate with rotatable idler roll 16. The inner diameter or bore of contact seal or felt seal 60 should be such as to provide a snug but not tight fit relative to the outer diameter of stationary sleeve 80 since this is the interface where the contact sealing action of the felt seal with respect to sleeve 80 occurs. The outer diameter of felt seal 60 should be less than the inner diameter of axially extending cylindrical wall 72 of seal retainer cup 70 to permit radial movement of felt seal 60, if necessary, for self-alignment of the bore of the felt seal with respect to the outer diameter of sleeve 80.

Felt seal 60 in the preferred embodiment is die cut from medium soft felt 61 which has laminations 62 of Neoprene rubber permanently bonded to it. The laminations of Neoprene rubber, which are bonded to the felt seal 60, improve the dimensional stability of the felt seal 60 as compared to a felt seal made of felt alone. This dimensional stability is needed to assure sealing contact between the stationary sleeve 80 and the rotating felt seal 60 without excessive radial pressure between the two, since the higher the radial pressure between the rotating felt seal 60 and the stationary sleeve 80, the higher the drag on the rotatable idler roll 16.

The spacing between the facing surfaces of the radial end wall 54 of seal case cup 50 and the radial end wall 74 of seal retainer cup 70 between which felt seal 60 is retained should be sufficiently less than the normal uncompressed axial thickness of felt seal 60 under sufficient axial compression to provide a snug fit in an axial direction of felt seal 60 with respect to the spacing between walls 54 and 74 of seal case cup 50 and of seal retainer cup 70. The felt seal is resilient in the axial dimension of the cartridge whereby to facilitate the axial comprssion thereof just referred to. This snug fit of felt seal 60 in an axial direction should be sufficient to prevent rotation of felt seal 60 relative to seal case cup 50 and to seal retainer cup 70, but at the same time permitting radial movement of felt seal 60 if required. This radial displacement of felt seal 60 id desirable and will occur if the inside diameter or bore of felt seal 60 is not concentric in assembly and/or in operation with the outside diameter of sleeve 80, thereby providing the "self-aligning" feature of felt seal 60 previously referred to, whereby the internal diameter of the bore of felt seal 60 will at all times accommodate itself to the outer diameter of cartridge sleeve 80 if the diameter of the bore of the felt seal 60 and the outer diameter of cartridge sleeve 80 are not concentric in assembly and/or in operation. This self-aligning feature insures a constant sealing action at all times at the interface between felt seal 60 and sleeve 80 as felt seal 60 rotates with respect to cartridge sleeve 80 during rotation of idler roll 16 relative to stationary shaft 18.

Felt seal 60 is preferably prelubricated with light oil. The light oil prelubrication and the Neoprene rubber laminations which are permanently bonded to the felt help to prevent wicking of water into felt seal 60 and also help to prevent movement of extremely fine dust into the felt seal 60.

The diameter of the bore 75 in radial wall portion 74 of seal retainer cup 70 should be such as to provide a loose clearance fit over the outer diameter of sleeve 80. Seal retainer cup 70 is preferably drawn or press formed from a blank of soft steel sheet, which is preferably plated for corrosion resistance and appearance. The gauge of the material of which seal retainer cup 70 is made is preferably the same as the gauge of the material of which seal case cup 50 is made.

Sleeve 80 is a shaft mounted member whose outer diameter, as previously explained, forms a sealing surface for felt seal 60, sleeve 80 also serving as a containment and closure control for plastically and elastically deformable collapsible spacer 100, to be described hereinafter. The sleeve 80 also serves, due to the provision of detent means 84 on the sleeve which engage corresponding cooperating recess means 86 on shaft 18, as a means for locking the elements on the carrier roll assembly together with proper preload and fit. Thus, the end of sleeve 80 opposite the enlarged end 82 is provided with a pair of diametrically opposed flat detent means each indicated at 84 which are adapted to snap into locking engagement with the cooperating diametrically opposed flat notches or recesses 86 of shaft 18 whereby to lock the sleeve 80 in a predetermined position at final assembly as seen in FIG. 2 whereby to gauge the preload or, alternatively, the end play applied to the tapered roller bearing assembly 34. The use of the flat detents 84 on sleeve 80 engaging the flat notches or recesses 86 on shaft 18 prevents rotation of sleeve 80, of collapsible spacer 100, and of labyrinth cup 90 relative to shaft 18.

The axial length of the detents 84 on sleeve 80 are less than the axial dimension of notches or recesses 86 on shaft 18. This permits detents 84 to move in an axially inward direction into abutting relation to the axially inner shoulder of recess 86 on shaft 18 when sleeve 80 is axially moved inwardly to apply a deforming pressure to collapsible spacer 100, as will be explained in connection with the assembly operation. In the final assembled condition, as seen in FIG. 2, after axial pressure has been released from sleeve 80, the elastic characteristic of collapsible spacer 100 moves sleeve 80 axially outwardly to cause detent 84 to engage the axially outer shoulder of recess 86 of shaft 18.

The axial length of recess 86 on shaft 18 relative to the axial length of detent 84 on sleeve 80 determines how far sleeve 80 can travel in an axially outward direction under the influence of the elastic deformation in collapsible spacer 100 when axial pressure is released from sleeve 80 after completion of the spacer collapsing operation during assembly (to be described). This amount of axially outward travel of sleeve 80 continues until detent 84 on sleeve abuts against the axially outer shoulder of recess 86, as seen in the assembled view of FIG. 2. The amount of travel of sleeve 80 in an axially outer direction as just described determines the amount of stored elastic energy in the collapsible spacer which is released and, conversely, how much stored elastic energy remains in the collapsible spacer 100 to axially preload the bearing cone 42. Essentially the function of the axial preload force applied by collapsible spacer 100 to bearing cone 42 is to prevent axial movement of bearing cone 42 and bearing cup 38 relative to each other.

The axial length of recess 86 on shaft 18 relative to the axial length of the corresponding detent 84 on sleeve 80 may be made such as to permit a sufficient axially outward travel of sleeve 80 to completely release all the stored elastic energy in the collapsible spacer 100. In such case, there would be no elastic energy remaining in the collapsible spacer 100 to preload the bearing cone 42 and the cartridge subassembly 36 would be at the threshold of permitting end play of bearing cone 42 and bearing cup 38 relative to each other. Carrying this discussion one step further, if the axial length of recess 86 of shaft 18 is made even longer than that necessary to permit complete release of all the stored elastic energy in the collapsible spacer 100 so that detent 84 of sleeve 80 is free to move axially outwardly along recess 86 of shaft 18 even further than necessary to completely release the stored elastic energy in collapsible spacer 100, then the relation of the cartridge assembly 36 to the tapered roller bearing 34 becomes one in which the cartridge assembly will begin to permit end play of bearing 34, in which bearing cone 42 and bearing cup 38 are permitted to have a limited or controlled axial movement relative to each other, bearing cone 42 moving in an axially outward direction relative to bearing cup 38, as viewed in FIG. 2. The amount of end play of bearing 34 permitted is determined by the excess axial length of recess 86 in shaft 18 beyond the axial length of recess 86 necessary to achieve complete release of the stored elastic energy in collapsible spacer 100.

Throughout the specification, in order to simplify the explanation, the detent means 84 on sleeve 80 and the cooperating recess or notch 86 on shaft 18 may sometimes be referred to in the singular as though there were only one detent means 84 at the end of a given sleeve 80, ans as though there were only one recess means or notch 86 on shaft 18 cooperating with the aforementioned detent means 84. However, it will be understood that, as shown in the preferred illustrated embodiment, and as best seen in FIGS. 2, 4 and 5, there are actually a plurality of detent means 84 (in the specific illustrated embodiment, two detent means 84 at the end of a given sleeve 80), each of the plurality of detent means 84 of the given sleeve being adapted to cooperate with one of a plurality of corresponding recesses or notches 86 contiguous the corresponding end of shaft 18.

Sleeve 80 is preferably a drawformed stainless steel tube with one end swage formed or enlarged to provide a bell-shaped end as indicated at 82 to retain and locate the free collapsible spacer 100 and to limit the minimum axial length of collapsible apacer 100. The bell end or enlarged end 82 of sleeve 80 is provided with a notch 88 for engaging a cooperating tab or key 91 of the labyrinth cup 90, as will be explained in more detail hereinafter.

The inner diameter or the bore of sleeve 80 is so dimensioned as to be a close free slidable fit over shaft 18. Sleeve 80 is nonrotatable with respect to the stationary shaft 18, but is axially slidable along shaft 18. Detents 84 of sleeve 80 should have sufficient strength to withstand the compression load in shear when sleeve 80 is finally assembled relative to shaft 18 with detents 84 of sleeve 80 engaging the cooperating recesses 86 of shaft 18.

The labyrinth cup, generally indicated at 90, is a shaft mounted member and includes a bore 92 which is a close free fit over shaft 18 which permits a limited degree of axial displacement of labyrinth cup 90 along shaft 18 during the process of assemblying the cartridge assembly 36 or 36' as part of the idler roll assembly seen in FIG. 2. As best seen in FIG. 5, labyrinth cup 90 includes an annular wall portion 94 extending radially outwardly from bore 92, the radially outer end of wall portion 94 merging into an axially outwardly extending flared or bell-shaped wall portion 95 having an inner diameter equal to or just slightly greater than the outer diameter of collapsible spacer 100, the inner diameter of bell-shaped wall portion 95 of labyrinth cup 90 being substantially the same as the inner diameter of flared or bell-shaped end 82 of sleeve 80. The flared or bell-shaped wall portion 95 of labyrinth cup 90 merges at its axially outer end into a short radially extending wall portion 96 which then merges with an axially extending cylindrical wall portion 97 having an inner diameter just slightly greater than the outer diameter of flared or bell-shaped end 82 of sleeve 80. Cylindrical wall portion 97 of labyrinth cup is in radially overlying relation to flared or bell-shaped end 82 of sleeve 80. Axially and cylindrically extending wall portion 97 of labyrinth cup 90 is bounded at its axially outer or left-hand end with respect to the view shown in FIG. 5 by a radially extending wall portion 98. The outer diameter of radially extending portion 98 of labyrinth cup 90 is a loose fit inside retainer cup 110. Labyrinth cup 90 is provided with a struck-out tab or key 91 which is receive in notch 88 on bell-shaped end portion 82 of sleeve 80 whereby to prevent any rotation of labyrinth cup 90 relative to the non-rotatable sleeve 80. Tab 91 in effect serves as a "key" which engages notch 88 of bell-shaped end 82 of sleeve 80 to prevent any rotation of labyrinth cup 90.

As previously mentioned, labyrinth cup 90 may be axially displaced within the confines of the cartridge subassembly from the axial position which it occupies within the subassembly 36 prior to installation of the cartridge subassembly 36 in the idler roll assembly 10 (FIG. 2) to the relative axial position which it occupies when the cartridge subassembly is installed in the idler roll assembly as seen in FIG. 2. For example, prior to installation in the idler roll assembly 10, the axially inner face of the radial flange portion 98 (FIG. 5) of labyrinth cup 90 may be in face-to-face abutting relation to the axially outer face of radially extending end wall 114 of retainer cup 110. However, during the assembly process into the final assembly of FIG. 2, the axial pressure applied during the assembly procedure, as will be described hereinafter, will cause the engagement of the radial wall 94 of labyrinth cup 90 with the abutting surface of bearing cone 42 to cause trial movement of labyrinth cup 90 along shaft 18 to a position such as that shown in FIG. 2 or FIG. 5.

The inside diameter of the bell-shaped end portion 82 of sleeve 80 should be substantially the same as or just slightly larger than and in radially overlying relation to the outer diameter of collapsible spacer 100. Also, as previously mentioned, the inner diameter of bell-shaped portion 95 of labyrinth cup 90 should be equal to or just slightly larger than and in radially overlying relation to the outside diameter of collapsible spacer 100.

It will thus be seen that the bell-shaped end 82 of sleeve 80 and the bell-shaped portion 95 of labyrinth cup 90 cooperate to form a pocket-like receptacle for the collapsible spacer 100 with the inner diameters of the respective bell-shaped ends 82 of sleeve 80 and 95 of labyrinth cup 90 closely radially overlying the outer diameter of collapsible spacer 100. This relationship just described of the bell-shaped ends 82 of sleeve 80 and 95 of labyrinth cup 90 to the outer diameter of collapsible spacer 100 is important since it serves to provide an effective control of the positional relationship of the collapsible spacer 100 during the period when sleeve 80 is axially moved to plastically and elastically collapse spacer 100. The relationship of the bell-shaped ends 82 of sleeve 80 and 95 of labyrinth cup 90 to the collapsible spacer 100 insures an always constant and always predictable pattern of axial collapsing or deformation of spacer 100, upon the application of axial pressure thereto, and avoids any undesirable patterns of collapsing action, such as radial extrusion of the spacer 100, which would render the collapsible spacer 100 ineffective for its intended purpose. The radial wall portion 94 of labyrinth cup 90 serves as a bearing surface which is interposed between collapsible spacer 100 and bearing cone 42 of tapered roller bearing assembly 34. Preload force exerted by collapsible spacer 100 in the final assembled position of the idler roll assembly 10 as seen in FIG. 2 is transmitted through radial wall portion 94 of the labyrinth cup 90 to bearing cone 42. Furthermore, during the assembly operation, when collapsible spacer 100 is plastically and elastically deformed, the compressive force exerted by sleeve 80 on collapsible spacer 100 is transmitted through wall 81 of sleeve 80 (contiguous and partially defining) bell-shaped end 82 of sleeve 80, to collapsible spacer 100.

The collapsible spacer 100 is a commercially available calibrated element of annular shape and made of stainless steel or other suitable material for absorbing, together with the similar collapsible spacer 100' (FIG. 2) carried by oppositely-disposed cartridge subassembly 36', all clearances or variations in length resulting from manufacturing tolerances of the idler roll components when installed, including but not restricted to clearances or variations in length resulting from manufacturing tolerances of idler roll 16, shaft 18, and oppositely disposed bearing assemblies 34 and 34'; the collapsible spacer 100 also being capable of providing a desired amount of axial preload on bearing cone 42 automatically without the need for selective adjustment as long as the manufacturing clearances absorbed by the plastic deformation of the collapsible spacer are within a predetermined range of manufacturing dimensional tolerances for which the particular collapsible spacer is calibrated. The collapsible spacer 100 may also be calibrated in accordance with other parameters such as axial force required to axially collapse the spacer (which is also a measure of the stored elastic deformation force available), diameter of the spacer, and the material of which the collapsible spacer is made. The collapsible spacer 100 is characterized by the fact that it is plastically deformable to absorb manufacturing clearances within a predetermined range of travel and is also elastically deformable over the same range; and for any plastic deformation within a given range of travel for which the collapsible spacer is designed, sa substantially constant elastic deformation will be available. The collapsible spacer 100 is so selected as to collapse plastically, when taken in conjunction with the oppositely disposed collapsible spacer 100', by an amount sufficient to cover the entire range of manufacturing tolerances of all the parts involved in the idler roll assembly 10. The amount of elastic deformation of each collapsible spacer and consequent spring force utilizable as a preload on the bearing cone 42 is practically constant over the range of plastic deformation of either collapsible spacer 100 or 100' used to compensate for manufacturing tolerances of the parts involved in the idler roll assembly 10. The available elastic deformation of each spacer 100 can be released in part or totally, depending on the bearing preload or end play to be achieve; and the amount of elastic deformation which remains in the collapsible spacer 100 depends on the axial length of the recess 86 on shaft 18 which engages the detent 84 of the sleeve 80. The amount of elastic deformation which is retained in the collapsible spacer 100 in the final assembled position of FIG. 2 determines the force exerted by the collapsible spacer on the bearing cone 42 thereby predetermining the preload of the tapered roller bearing 34. Plastically and elastically deformable spacers of the type hereinbefore described are made commercially under the trademark designation "Temper-Load Ring" by the Temper Corporation, located at Persse Road, Fonda, New York 12068 and are described in a brochure entitled "Design with Temper-Load Rings" published by the aforesaid Temper Corporation, copyright 1970.

Collapsible spacers which are capable of elastic and plastic deformation in the general manner hereinbefore described are also described in the aforesaid U.S. Pat. Nos. 3,672,019 issued to Thomas George Barnbrook et al on June 27, 1972 and 3,726,576 issued to Thomas George Barnbrook et al on Apr. 10, 1973.

The retainer cup 110 serves to lock all the previous elements into a self-contained cartridge subassembly. The retainer cup 110 includes an axially and cylindrically extending cup-like wall portion 112 whose outer diameter is such as to provide a press fit with respect to the inner diameter of the seal case cup 50, whereby retainer cup 110 rotates with seal case cup 50 and felt retainer cup 70 with rotatable roll 16. Retainer cup 110 also includes a radially extending end wall 114 having a bore 116 which has a loose fit with respect to the outer diameter of axially extending cylindrical wall portion 97 of labyrinth cup 90.

Radial wall 114 of retainer cup 110, cylindrical wall portion 97 of labyrinth cup 90, radial wall portion 98 of labyrinth cup 90 and radial wall 74 of seal retainer cup 70, and the passages between these various walls define a labyrinthian path or labyrinth seal which supplements the felt seal or contact seal 60 to prevent egress of lubricant from the bearing 34 or the ingress of dust or dirt into the bearing 34.

At various places in the specification and claims, the terms "axially inner" and "axially outer" have been used in referring to various elements of the cartridge subassembly. These terms axially inner and axially outer refer to the orientation of the respective elements or parts thereof in the assembled idler roll as seen in FIG. 2 of the drawings.

Lubricating grease for bearing assembly 34 is admitted to the hollow interior 19 of stationary shaft 18, the grease passing upwardly into the bearing region through a radial hole 26, or other means in shaft 18.

A grease retainer generally at 25, 25' is provided contiguous the axially inner end of each bearing assembly 34. Grease retainer 25 may be made of a suitable plastic material such as nylon and comprises an axially extending sleeve-like portion 27 which is coaxially positioned about the outer diameter of stationary shaft 18, and a radially extending flange-like portion 29 having a circumferential groove 31 therein which receives "O" ring 35. O ring 35 which is made of a suitable elastomeric material such as rubber, performs the dual function of sealing the grease retainer to the inner diameter of the cylindrical portion between portions 33 and 40 of rotatable roll 16, and also of preventing relative rotation between cup portion 32 and grease retainer 25. Grease retainer 25 rotates with the rotatable idler roll structure 16 and relative to stationary shaft 18. The radial clearance between the radially outer surface of flange portion 29 of grease retainer 25 and the radially inner surface of cup portion 32 of roll 16 and the longitudinal (axial) clearances of flange portion 29 of grease retainer 25 relative to bearing cup 38 and cup portion 32 of roll 16 are all such as to make it possible for the rotating grease retainer 25 to center itself on stationary shaft 18 and to absorb the deflection of shaft 18 under load, whereby to prevent any binding between sleeve portion 27 of grease retainer 25 and stationary shaft 18. The clearance between stationary shaft 18 and rotating grease retainer 25 is maintained at a minimum yet sufficient to avoid radial pressure between these two members. When grease is applied to the bearing assembly 34, the pressure required to cause grease to leak past the grease retainer 25 toward the inside of the idler roll shell 16 is quite high because of the small clearance maintained between the inner diameter of grease retainer 25 and the outer diameter of shaft 18 over a substantial length, and consequently only a very small amount of grease will leak past the retainer.

A further feature of the construction of idler roll assembly 10 is the provision of a thin gauge steel tube indicated at 39 which extends between the two oppositely disposed cup portions 32, the thin tube 39 having the ends thereof flared as indicated at 41. The thin tube 39 serves two functions as follows: (1) it contains any leakage of grease past the oppositely-disposed grease retainers 25; and (2) tube 39 serves to limit the amount of air which by thermal expansion and contraction might cause the idler seal to "breathe." Such "breathing" tends to cause movement of grease past the seal towards the outside when the air inside the idler roll 16 expands, and tends to suck contaminants into the seal structure toward the bearing 34 when the air inside the idler roll 16 contracts. Therefore, by reducing the volume of air which can breathe with respect to the bearing and seal structure, the inner tube 39 minimizes the aforesaid undesirable effects of such breathing.

If desired, an auxiliary dust shield indicated at 117 in FIG. 2 formed of a suitable elastomeric material or the like may be placed at each end of the idler roll assembly 10. As seen in the assembled view of FIG. 2, dust shield 117 is positioned contiguous the axially outer end of the assembled cartridge sleeve 80 with the inner diameter or bore of dust shield 117 being in radially overlying relation to detents 84 on sleeve 80. The inner periphery of the bore of dust shield 117 is contoured to match the outer periphery of the sleeve detents 84, whereby to prevent rotation of auxiliary dust shield 117 relative to stationary cartridge sleeve 80. The function of the auxiliary dust shield 117 is to provide additional protection against dirt ingress into the bearing assembly when conditions are extreme.

In some instances, it may be desirable to provide a suitable venting means (not shown) in the bearing sealing and preloading cartridge subassembly 36, the venting means serving to vent the interior of the idler roll assemblfy 10 to the exterior of assembly 10, whereby to prevent the build-up of excessive pressure differentials between the inside and the outside of the roller assembly.

While the bearing sealing and adjusting subassembly has been described as embodied in an apparatus provided with tapered roller bearings, and has particular utility in connection with such apparatus, the subassembly also has utility in connection with and cooperates with other types of bearings, such as ball bearings, and also other types of roller bearings. The plastic deformation characteristic of the collapsible pacer may have particular utility in absorbing manufacturing clearances in apparatus embodying such other types of bearings in a manner similar to that described hereinbefore.

Also while the bearing sealing and adjusting subassembly of the invention has been described as embodied in connection with an idler roll assembly which includes a stationary shaft and a roll member which rotates about the stationary shaft, the bearing sealing and adjusting subassembly of the invention also has utility in connection with apparatus in which the shaft is the rotatable member and rotates relative to stationary structure positioned about the rotatable shaft.

The following is a brief summary of a manual assembly procedure which may be followed to assemble the idler roll assembly generally indicated at 10 in the assembly view of FIG. 2.

1. Press both grease retainers 25 and 25' and both bearing cups 38 and 38' into the respective oppositely disposed axially inwardly extending cup portions 32 and 32' to the positions shown in the assembled view of FIG. 2 of idler roll 16. The axially inner end of each bearing cup 38 or 38' will seat against the corresponding shoulder 40 or 40' of cup portion 32 or 32'.

2. Assemble shaft 18 through the two grease retainers 25 and 25' and through the two cup portions 32 and 32'.

3. Center shaft 18 in an axial direction relative to the axial dimension of rotatable idler roll 16.

At this point of the assembly procedure, shaft 18 is supported freely in idler roll 16 by grease retainers 25 and 25'.

4. Assemble the respective oppositely disposed bearing cones 42, 42' and their associated tapered bearing rollers 44, 44' and associated bearing cages 46, 46' on shaft 18 until the tapered rollers 44, 44' of the respective bearing cones are in contact with their corresponding bearing cups 38, 38'.

5. Assemble each of the oppositely-disposed complete sealing and preloading cartridge subassemblies 36 and 36' on the respective outer ends of shaft 18.

At this point in the assembly procedure, most of the axial length of each of the respective cartridge subassemblies 36 and 36' will lie on the corresponding ends of shaft 18 axially outwardly of the respectively end wall portions 30, 30' of the respective end cups 28, 28'.

In this position of step 5, the detents 84 of the respective cartridge subassemblies 36, 36' should be circumferentially aligned with the recesses or notches 86 at the respective opposite ends of shaft 18, so that the detents 84 will be capable of engaging the notches 86 at a later step in the assembly procedure herein being described.

At this stage of the assembly procedure, the detents 84 of the respective cartridge subassemblies 36 and 36' overhang and do not engage the respective opposite outer ends of shaft 18.

6. Using suitable pressure applying means, axial pressure is applied simultaneously to the respective oppositely disposed entire cartridge subassemblies 36 and 36'. This axial pressure is not released until the axially outer face of the end wall 54, 54' of each oppositely-disposed seal case cup 50, 50' is flush with the axially outer face of the end of the corresponding respective end wall 30 and 30' of the respective end cups 28, 28'. This axial pressure is applied simultaneously against the axially outer face of each respective seal case cup 50, 50' and also against the sleeve 80 of each respective cartridge subassembly 36, 36', causing each respective cartridge subassembly 36, 36' to move axially as a unit during this step of the assembly procedure. During this step of the assembly procedure, suitable means is provided to expand the detent means 84 of sleeve 80, 80' of each cartridge subassembly 36, 36' whereby to cause the detent means 84 to be expanded so as to move onto and along the outer diameter of shaft 18.

At the conclusion of this axial pressing operation of step 6 as just described, in which each cartridge subassembly 36, 36' has been moved axially as a unit until the axially outer face of each corresponding wall 54, 54' of seal case cup 50, 50' is flush with the axially outer face of the corresponding wall 30, 30' of end cups 28, 28', as just described, the sleeve detents 84 of the respective oppositely disposed cartridge subassemblies 36, 36' (FIG. 2) may not be seated in the corresponding recesses 86 contiguous the opposite ends of the shaft 18, or the detents of one of the cartridge assemblies 36, 36' may be seated in their corresponding recesses 86 while the detents 84 of the oppositely-disposed cartridge subassembly may not be seated in their corresponding recesses 86.

7. With the cartridge subassemblies 36 and 36' in the position to which they have been moved at the completion of step 6, as just described, in which the axially outer face of wall 54 of the seal case cup 50 of each respective cartridge subassembly is flush with the axially outer face of the corresponding wall 30 or 30' of end cup 28 or 28', no further axial pressure is applied to the respective seal case cups 50 and 50', but axial pressure continues to be applied against the sleeve portion 80, 80' of each respective cartridge subassembly 36 and 36' until the resilient sleeve detents 84 of each respective cartridge subassembly 36, 36' snap into their corresponding recesses 86 at the respective opposite ends of the shaft 18 and move along the recess, each respective sleeve 80, 80' being moved sufficiently by the applied axial pressure to cause each respective detent 84 to stop against the axially inner shoulder of its corresponding recess 86. This axial movement of each respective cartridge sleeve 80 independently of the rest of its corresponding cartridge subassembly causes a plastic and elastic deformation of the corresponding collapsible spacer 100, 100' of each respective cartridge subassembly 36, 36'. The plastic deformation of the two cartridge subassemblies 36 and 36' at the respective opposite ends of the shaft 18 together absorb all manufacturing clearances resulting from manufacturing tolerances of the various components of the idler roll assembly.

8. The axial pressing force against the respective sleeves 80, 80' of each of the oppositely disposed cartridge subassemblies 36 and 36' is now released and the spring-like elastic deformation present in each of the respective collapsible spacers 100 and 100' will cause the corresponding sleeve 80, 80' to move axially outwardly until the detents 84 of each respective sleeve 80, 80' of the respective oppositely-disposed bearing cartridge subassemblies 36 and 36' engage with the axially outer shoulder of the corresponding recesses 86 at each end of the shaft. This axially outward movement of the respective sleeves 80 and 80' will permit a controlled amount of the elastic deformation in the respective collapsible spacers 100 and 100' to be released, thereby controlling the preloading force exerted by the respective collapsible spacers 100 and 100' on the respective bearing cones 42 and 42'.

Since, as previously explained, the available elastic deformation remains the same for a given calibrated collapsible spacer 100 or 100' operating within a predetermined range of plastic deformation, each collapsible spacer 100 and 100' will release the same proportion of its available elastic deformation energy in the axially outward movement of the respective sleeves 80 and 80' just described, since the amount of axially outward movement of each sleeve 80, 80' will be the same as determined by the axial length of the recess 86 in shaft 18 relative to the axial length of detent 84 on sleeve 80.

Since the amount of elastic deformation is practically a constant characteristic of the collapsible spacer 100 within a given range of plastic deformation, the amount of bearing axial preload or end play can be controlled and held constant from one assembly to the next by the proper selection of axial length of recess 86 and by proper specification of component tolerances so that the extreme variations of distance between the two bearing cones versus the location of shaft recesses 86 can be accomodated in all cases by the permissible plastic deformation of the collapsible spacers.

Also, as previously explained earlier in the specification, the axial length of the recess 86 in shaft 18 relative to the axial length of the detent 84 may be such as to permit complete release of the stored elastic deformation in the collapsible spacer 100 in which case the deformable spacer 100 does not apply any preload force to the contiguous tapered roller bearing assembly 34 and the contiguous tapered roller bearing assembly 34 is at the "threshold" of end play; or the axial length of recess 86 may be made even longer by a controlled distance than is necessary to completely release the stored elastic deformation in collapsible spacer 100, in which case the contiguous tapered roller bearing assembly 34 is permitted to have a controlled amount of end play.

While the foregoing has been a brief description of a manual assembly procedure which may be followed for experimental work, the final manufacturing procedure which will ultimately be followed may be a semi-automatic procedure with a minimum of manual functions, or possibly even a completely automatic procedure.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A combined bearing sealing and adjusting subassembly for use with an idler roll assembly comprising a stationary shaft and a rotatable idler roll which rotates relative to said stationary shaft upon a tapered roller bearing assembly, said roller bearing assembly comprising an outer race carried by said rotatable idler roll, an inner race mounted on said shaft and tapered rollers interposed between said outer and said inner races, said subassembly comprising a sleeve member adapted to be coaxially positioned upon said shaft, seal means forming part of said subassembly for the purpose of normally preventing egress of lubricant from the bearing assembly or the ingress of foreign matter into the bearing assembly, an axially inwardly extending retaining portion formed on the axially inner end of said sleeve member, a plastically and elastically deformable collapsible spacer member adapted to be retained by said retaining portion of said sleeve member, said spacer member being characterized by the fact that it is plastically deformable to absorb manufacturing clearances of said idler roll assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the tapered roller bearing assembly, said sleeve member being movable axially inwardly relative to said idler roll assembly along said shaft whereby to plastically and elastically deform said spacer member, means defining a bearing surface for said spacer member interposed between the axially inner end of said spacer member and said inner race of said roller bearing assembly, and means carried by said sleeve member and adapted to cooperate with means on said shaft whereby to permit a predetermined axially outward movement of said sleeve member along said shaft subsequent to the deformation of said spacer member whereby to permit a controlled release of a predetermined proportion of the elastic deformation of said spacer member and thus whereby to control the adjustment of said tapered roller bearing assembly.

2. A combined bearing sealing and adjusting subassembly for use with an idler roll assembly as defined in claim 1 in which said seal means includes a seal member adapted to cooperate with said sleeve member to provide a contact sealing action at the interface between said seal member and the outer diameter of said sleeve member.

3. A combined bearing sealing and adjusting subassembly for use with an idler roll assembly as defined in claim 1 in which said seal means includes means defining a labyrinth seal.

4. A combined bearing sealing and adjusting assembly for use with an idler roll assembly as defined in claim 1 in which said seal means comprises a seal member as defined in claim 2 and additionally comprises means defining a labyrinth seal as defined in claim 3.

5. A combined bearing sealing and adjusting subassembly as defined in claim 1 in which said means defining a bearing surface for said collapsible spacer member additionally comprises an axially outwardly extending retaining portion adapted to cooperate with said axially inwardly extending retaining portion of said sleeve member whereby to define a retaining and confining means for said spacer member.

6. A combined bearing sealing and adjusting subassembly for use with an idler roll assembly comprising a stationary shaft and a rotatable idler roll which rotates relative to said stationary shaft upon a tapered roller bearing assembly, said roller bearing assembly comprising an outer race carried by said rotatable idler roll, an inner race mounted on said shaft and tapered rollers interposed between said outer and said inner races, said subassembly comprising a sleeve member adapted to be coaxially positioned upon said shaft, contact seal means forming part of said subassembly and adapted to cooperate with said sleeve member to provide a contact sealing action at the interface between said contact seal means and the outer diameter of said sleeve member, a labyrinth cup contiguous the axially inner end of said sleeve member relative to said idler roll assembly, said labyrinth cup including an inner bore adapted to seat with a close free fit on the outer diameter of said shaft, said labyrinth cup including a wall portion extending radially outwardly from said inner bore and adapted to bear against said inner race of said tapered roller bearing assembly, an axially outwardly extending retaining portion formed on said wall portion of said labyrinth cup, an axially inwardly extending retaining portion formed on the axially inner end of said sleeve member, the respective retaining portions of said labyrinth cup and of said sleeve member cooperating to define a retaining and confining means for a plastically and elastically deformable collapsible spacer member, a plastically and elastically deformable collapsible spacer member received between said respective retaining portions of said sleeve member and of said labyrinth cup, said spacer member being characterized by the fact that it is plastically deformable to absorb manufacturing clearances of said idler roll assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the tapered bearing assembly, said sleeve member being movable axially inwardly relative to said idler roll assembly along said shaft whereby to plastically and elastically deform said spacer member, and means carried by said sleeve member and adapted to cooperate with means on said shaft whereby to permit a predetermined axially outward movement of said sleeve member along said shaft subsequent to the deformation of said spacer member whereby to permit a controlled release of a predetermined proportion of the elastic deformation of said spacer member and thus whereby to control the adjustment of said tapered roller bearing assembly.

7. A combination bearing sealing and adjusting subassembly for use with an idler roll assembly of the type comprising a stationary shaft and a rotatable idler roll which rotates relative to said stationary shaft upon a tapered roller bearing assembly, said tapered roller bearing assembly comprising a bearing cup carried by said rotatable idler roll, a bearing cone mounted on said shaft, and tapered rollers interposed between said bearing cup and said bearing cone, said subassembly comprising a sleeve member adapted to be coaxially positioned upon said shaft, a seal case cup having a cylindrical and axially extending wall adapted to be engaged with an axially extending wall portion of said idler roll whereby said seal case cup rotates with said idler roll relative to said stationary shaft, said seal case cup including at an axially outer end thereof to said idler roll assembly a radially inwardly extending annular wall having a close running fit with the outer diameter of said sleeve member, a seal retainer cup received within said seal case cup and including a cylindrical and axially extending wall adapted to be engaged with the inner diameter of said cylindrical and axially extending wall of said seal case cup whereby said seal retainer cup rotates with said seal case cup, said seal retainer cup including at its axially inner end a radially inwardly extending annular wall having a bore with a running clearance relative to the outer diameter of said sleeve member, an annular contact seal means secured under axial compression between the facing radially extending walls of said seal case cup and said seal retainer cup, said contact seal means having an axial bore of such inner diameter relative to the outer diameter of said sleeve member as to provide a snug sealing fit of said contact seal at the sealing interface between said bore of said contact seal and the outer diameter of said sleeve member, a labyrinth cup contiguous the axially inner end of said sleeve member relative to said idler roll assembly, said labyrinth cup including an inner bore adapted to seat with a close free fit on the outer diameter of said shaft, said labyrinth cup including an annular wall portion extending radially outwardly from said bore and adapted to bear against the contiguous wall of the cone of said tapered roller bearing assembly, an axially outwardly extending bell-shaped portion formed on the radially outer end of said radial wall portion of said labyrinth cup, an axially inwardly extending bell-shaped portion formed on the axially inner end of said sleeve member, the respective bell-shaped portions of said labyrinth cup and of said sleeve member defining a retaining and confining means for a plastically and elastically deformable collapsible spacer member, a plastically and elastically deformable collapsible spacer member received between said respective bell-shaped portions of said sleeve member and of said labyrinth cup, said spacer member being characterized by the fact that it is plastically deformable to absorb manufacturing clearances of said idler roll assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the tapered roller bearing assembly, said sleeve member being movable axially inwardly relative to said idler roll assembly along said shaft to plastically and elastically deform said spacer member, and means carried by said sleeve member and adapted to cooperate with means on said shaft member whereby to permit a predetermined axially outward movement of said sleeve member along said shaft subsequent to the deformation of said spacer member whereby to permit a controlled release of a predetermined proportion of the elastic deformation of said spacer member, and thus whereby to control the adjustment of said tapered roller bearing assembly.

8. A combined bearing sealing and adjusting subassembly as defined in claim 7 in which said contact seal means is formed of a felt-like material.

9. A combined bearing sealing and adjusting subassembly as defined in claim 8 in which said contact seal means comprises a laminated structure formed of laminations of felt-like material bonded to laminations of rubber-like material.

10. A combined bearing sealing and adjusting subassembly as defined in claim 7 which additionally comprises a retainer cup positioned contiguous the axially inner end of said subassembly relative to the idler roll assembly, said retainer cup comprising a cylindrical and axially extending wall adapted to be engaged with the inner diameter of said cylindrical and axially extending wall of said seal case cup whereby said retainer cup rotates with said seal case cup, said retainer cup including at its axially inner end a radially inwardly extending annular wall having an axial bore which has a loose clearance fit relative to an axially extending portion of said labyrinth cup, said retainer cup serving as a means for retaining the elements of said subassembly in a self-contained cartridge-like subassembly.

11. A combined bearing sealing and adjusting subassembly as defined in claim 10 in which said labyrinth cup includes an annular wall portion extending radially outwardly of said bell-shaped portion of said labyrinth cup and having an outer diameter which has a loose fit with respect to the inner diameter of said cylindrical and axially extending wall of said retainer cup; said radially extending wall of said retainer cup, said last mentioned radially extending annular wall portion of said labyrinth cup, and said radially extending wall of said seal retainer cup all cooperating to define a labyrinthian sealing path which supplements the sealing action of said contact seal means.

12. A combined bearing sealing and adjusting subassemblfy as defined in claim 7 in which said wall portion of said labyrinth cup which bears against the contiguous wall of the cone of said tapered roller bearing assembly defines a bearing surface for said collapsible spacer member which bearing surface is interposed between the axially inner end of said collapsible spacer member and said cone.

13. An idler roll assembly comprising a stationary shaft and a rotatable idler roll which rotates relative to said stationary shaft upon a pair of tapered roller bearing assemblies which are spaced from each other axially of said idler roll assembly, each roller bearing assembly comprising an outer race carried by said rotatable idler roll, an inner race carried by said shaft and tapered rollers interposed between said outer race and said inner race, a separate cartridge-like bearing sealing and adjusting subassembly interposed between said rotatable idler roll and said stationary shaft contiguous each of the respective tapered roller bearing assemblies, each said subassembly comprising a sleeve member adapted to be coaxially positioned upon said shaft, seal means forming part of each said subassembly for the purpose of normally preventing egress of lubricant from the bearing assembly or the ingress of foreign matter into the bearing assembly, an axially inwardly extending retaining portion formed on the axially inner end of the corresponding sleeve member of each subassembly, a corresponding separate plastically and elastically deformable collapsible spacer means adapted to be retained by the retaining portion of each corresponding sleeve member, each said spacer means being characterized by the fact that it is plastically deformable to absorb manufacturing clearances of said idler roll assembly within a predetermined range of travel of said spacer means and is also elastically deformable over the same range, and that for any plastic deformation within a given range of travel for which said spacer means is designed, a substantially constant elastic deformation is available, the plastic deformation of the respective collapsible spacer means of the sealing and preloading subassemblies contiguous the pair of tapered roller bearing assemblies together serving to absorb all dimensional clearances resulting from manufacturing tolerances of the idler roll assembly, the elastic deformation characteristic of each spacer means serving to provide a predetermined adjustment of the corresponding tapered roller bearing assembly, each said sleeve member being movable axially inwardly relative to said idler roll assembly along said shaft whereby to plastically and elastically deform said corresponding spacer means, separate corresonding means defining a bearing surface for each respective collapsible spacer means interposed between the axially inner end of each collapsible spacer means and the inner race of the corresponding roller bearing assembly, and means carried by each sleeve member and adapted to cooperate with corresponding means on said shaft whereby to permit a predetermined axially outward movement of each sleeve member along said shaft subsequent to the deformation of said respective corresponding spacer means whereby to permit a controlled release of a predetermined proportion of the elastic deformation in said corresponding spacer means and thus whereby to control adjustment of said corresponding tapered roller bearing assembly.

14. A combined bearing sealing and adjusting subassembly for use with a first assembly of the type comprising a shaft and a member positioned about said shaft, said shaft and said member being rotatable relative to each other upon a bearing assembly, said bearing assembly comprising an outer race carried by said member, an inner race mounted on said shaft, and bearing elements interposed between said outer and said inner races, said subassembly comprising a sleeve member adapted to be coaxially positioned upon said shaft, seal means forming part of said subassembly for the purpose of normally preventing egress of lubricant from the bearing assembly or the ingress of foreign matter into the bearing assembly, an axially inwardly extending retaining portion formed on the axially inner end of said sleeve member, a plastically and elastically deformable collapsible spacer member adapted to be retained by said retaining portion of said sleeve member, said spacer member being characterized by the fact that it is plastically deformable to absorb manufacturing clearances of said first assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the bearing assembly, said sleeve member being movable axially inwardly relative to said first assembly along said shaft whereby to plastically and elastically deform said spacer member, means defining a bearing surface for said collapsible spacer member interposed between the axially inner end of said collapsible spacer member and said inner race of said bearing assembly, and means carried by said sleeve member and adapted to cooperate with means on said shaft whereby to permit a predetermined axially outward movement of said sleeve member along said shaft subsequent to the deformation of said spacer member whereby to permit a cotrolled release of a predetermined proportion of the elastic deformation of said spacer member and thus whereby to control the adjustment of said bearing assembly.

15. A combined bearing sealing and adjusting subassembly for use with a first assembly of the type comprising a shaft and a member positioned about said shaft, said shaft and said member being rotatable relative to each other upon a tapered roller bearing assembly, said bearing assembly comprising an outer race carried by said member, an inner race mounted on said shaft, and tapered rollers interposed between said outer and said inner races, said subassembly comprising a sleeve member adapted to be coaxially positioned upon said shaft member, seal means forming part of said subassembly for the purpose of normally preventing egress of lubricant from the bearing assembly or the ingress of foreign matter into the bearing assembly, an axially inwardly extending retaining portion formed on the axially inner end of said sleeve member, a plastically and elastically deformable collapsible spacer member adapted to be retained by said retaining portion of said sleeve member, said spacer member being characterized by the fact that it is plastically deformable to absorb manufacturing clearances of said first assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the tapered roller bearing assembly, said sleeve member being movable axially inwardly relative to said idler roll assembly along said shaft whereby to plastically and elastically deform said spacer member, means defining a bearing surface for said collapsible spacer member interposed between the axially inner end of said collapsible spacer member and said inner race of said bearing assembly, and means carried by said sleeve member and adapted to cooperate with means on said shaft whereby to permit a predetermined axially outward movement of said sleeve member along said shaft subsequent to the deformation of said spacer member whereby to permit a controlled release of a predetermined proportion of the elastic deformation of said spacer member and thus whereby to control the adjustment of said tapered roller bearing assembly.

16. A combined bearing sealing and adjusting subassembly for use with an idler roll assembly comprising a stationary shaft and a rotatable idler roll which rotates relative to said stationary shaft upon a tapered roller bearing assembly, said roller bearing assembly comprising an outer race carried by said rotatable idler roll, an inner race mounted on said shaft, and tapered rollers interposed between said outer and said inner races, said subassembly comprising a sleeve member adapted to be coaxially positioned upon said shaft, seal means forming part of said subassembly for the purpose of normally preventing egress of lubricant from the bearing assembly or the ingress of foreign matter into the bearing assembly, an axially inwardly extending retaining portion formed on the axially inner end of said sleeve member, a plastically and elastically deformable collapsible spacer member adapted to be retained by said retaining portion of said sleeve member, said spacer member being characterized by the fact that it is plastically deformable to absorb manufacturing clearances of said idler roll assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the tapered roller bearing assembly, said sleeve member being movble axially inwardly relative to said idler roll assembly along said shaft whereby to plastically and elastically deform said spacer member, and means carried by said sleeve member and adapted to cooperate with means on said shaft whereby to permit a predetermined axially outward movement of said sleeve member along said shaft subsequent to the deformation of said spacer member whereby to permit a controlled release of a predetermined proportion of the elastic deformation of said spacer member and thus whereby to control the adjustment of said tapered roller bearing assembly.

17. An idler roll assembly comprising a stationary shaft and a rotatable idler roll which rotates relative to said stationary shaft upon a pair of tapered roller bearing assemblies which are spaced from each other axially of said idler roll assembly, each roller bearing assembly comprising an outer race carried by said rotatable idler roll, an inner race carried by said shaft and tapered rollers interposed between said outer race and said inner race, a separate cartridge-like bearing sealing and adjusting subassembly interposed between said rotatable idler roll and said stationary shaft contiguous each of the respective tapered roller bearing assemblies, each said subassembly comprising a sleeve member adapted to be coaxially positioned upon said shaft, seal means forming part of each said subassembly for the purpose of normally preventing egress of lubricant from the bearing assembly or the ingress of foreign matter into the bearing assembly, an axially inwardly extending retaining portion formed on the axially inner end of the corresponding sleeve member of each subassembly, a corresponding separate plastically and elastically deformable collapsiable spacer means adapted to be retained by the retaining portion of each corresponding sleeve member, each said spacer means being characterized by the fact that it is plastically deformable to absorb manufacturing clearances of said idler roll assembly within a predetermined range of travel of said spacer means and is also elastically deformable over the same range, and that for any plastic deformation within a given range of travel for which said spacer means is designed, a substantially constant elastic deformation is available, the plastic deformation of the respective collapsible spacer means of the bearing sealing and adjusting subassemblies contiguous the pair of tapered roller bearing assemblies together serving to absorb all dimensional clearances resulting from manufacturing tolerances of the idler roll assembly, the elastic deformation characteristic of each spacer means serving to provide a predetermined adjustment of the corresponding tapered roller bearing assembly, each said sleeve member being movable axially inwardly relative to said idler roll assembly along said shaft whereby to plastically and elastically deform said corresponding spacer means, and means carried by each sleeve member and adapted to cooperate with corresponding means on said shaft whereby to permit a predetermined axially outward movement of each sleeve member along said shaft subsequent to the deformation of said respective corresponding spacer means whereby to permit a controlled release of a predetermined proportion of the elastic deformation in said corresponding spacer means and thus whereby to control the adjustment of said corresponding tapered roller bearing assembly.

18. A combined bearing sealing and adjusting subassembly for use with a first assembly of the type comprising a shaft and a member positioned about said shaft, said shaft and said member being rotatable relative to each other upon a bearing assembly, said bearing assembly comprising an outer race carried by said member, an inner race mounted on said shaft, and bearing elements interposed between said outer and said inner races, said subassembly comprising a sleeve member adapted to be coaxially positioned upon said shaft, seal means forming part of said subassembly for the purpose of normally preventing egress of lubricant from the bearing assembly or the ingress of foreign matter into the bearing assembly, an axially inwardly extending retaining portion formed on the axially inner end of said sleeve member, a plastically and elastically deformable collapsible spacer member adapted to be retained by said retaining portion of said sleeve member, said spacer member being characterized by the fact that it is plastically deformable to absorb manufacturing clearances of said first assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the bearing assembly, said sleeve member being movable axially inwardly relative to said first assembly along said shaft whereby to plastically and elastically deform said spacer member, and means carried by said sleeve member and adapted to cooperate with means on said shaft whereby to permit a predetermined axially outward movement of said sleeve member along said shaft subsequent to the deformation of said spacer member whereby to permit a controlled release of a predetermined proportion of the elastic deformation of said spacer member and thus whereby to control the adjustment of said bearing assembly.

19. A combined bearing sealing and adjusting subassembly for use with a first assembly of the type comprising a shaft and a member positioned about said shaft, said shaft and said member being rotatable relative to each other upon a tapered roller bearing assembly, said bearing assembly comprising an outer race carried by said member, an inner race mounted on said shaft, and tapered rollers interposed between said outer and said inner races, said subassembly comprising a sleeve member adapted to be coaxially positioned upon said shaft member, seal means forming part of said subassembly for the purpose of normally preventing egress of lubricant from the bearing assembly or the ingress of foreign matter into the bearing assembly, an axially inwardly extending retaining portion formed on the axially inner end of said sleeve member, a plastically and elastically deformable collapsible spacer member adapted to be retained by said retaining portion of said sleeve member, said spacer member being characterized by the fact that it is plastically deformable to absorb manufacturing clearances of said first assembly within a predetermined range of travel of said spacer member and is also elastically deformable over the same range, and that for any plastic deformation within a given range of travel for which the spacer member is designed, a substantially constant elastic deformation is available, the elastic deformation characteristic of said spacer member serving to provide a predetermined adjustment of the tapered roller bearing assembly, said sleeve member being movable axially inwardly relative to said idler roll assembly along said shaft whereby to plastically and elastically deform said spacer member, and means carried by said sleeve member and adapted to cooperate with means on said shaft whereby to permit a predetermined axially outward movement of said sleeve member along said shaft subsequent to the deformation of said spacer member whereby to permit a controlled release of a predetermined proportion of the elastic deformation of said spacer member and thus whereby to control the adjustment of said tapered roller bearing assembly.

* * * * *